United States Patent
Reed et al.

(10) Patent No.: US 6,905,009 B2
(45) Date of Patent: Jun. 14, 2005

(54) BI-DIRECTIONAL CLUTCH HAVING A MOMENTARY LATCHING ACTUATOR

(75) Inventors: Clyde A. Reed, Roseville, MI (US); Brian K. Stefina, Waterford, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 76 days.

(21) Appl. No.: 10/448,655

(22) Filed: May 30, 2003

(65) Prior Publication Data

US 2004/0238306 A1 Dec. 2, 2004

(51) Int. Cl.[7] ............................................. F16D 41/08
(52) U.S. Cl. ........................... 192/43.1; 192/46; 192/47; 192/86; 192/92
(58) Field of Search ........................... 192/43.1, 46, 47, 192/86, 92

(56) References Cited

U.S. PATENT DOCUMENTS

| | | | |
|---|---|---|---|
| 1,831,955 A | 11/1931 | Harney | |
| 2,173,044 A | 9/1939 | Ruggles et al. | 180/44 |
| 2,290,089 A | 7/1942 | Bock | 180/49 |
| 2,551,939 A | 5/1951 | Gerst | 192/48 |
| 2,887,201 A | 5/1959 | Willis | 192/67 |
| 2,906,383 A | 9/1959 | Gabriel | 192/85 |
| 2,969,134 A | 1/1961 | Wiedmann et al. | 192/84 |
| 3,481,436 A | 12/1969 | Wilkowski | 192/35 |
| 3,517,573 A | 6/1970 | Roper | 74/711 |
| 3,631,741 A | 1/1972 | Kelbel | 74/781 |
| 4,114,478 A | 9/1978 | Clauss | 74/781 |
| 4,407,387 A | 10/1983 | Lindbert | 180/247 |
| 5,152,726 A | 10/1992 | Lederman | 475/324 |
| 5,355,981 A | 10/1994 | Itoh et al. | 192/35 |
| 5,413,201 A * | 5/1995 | Vidal | 192/69.41 |
| 5,466,195 A | 11/1995 | Nogle et al. | 475/55 |
| 5,535,869 A * | 7/1996 | Bigley et al. | 192/69.41 |
| 5,584,776 A | 12/1996 | Weilant et al. | 475/213 |
| 5,653,322 A | 8/1997 | Vasa et al. | 192/85 |
| 5,704,867 A | 1/1998 | Bowen | 475/221 |
| 5,806,643 A | 9/1998 | Fitz | 192/45.1 |
| 5,918,715 A | 7/1999 | Ruth et al. | 192/46 |
| 5,927,455 A * | 7/1999 | Baker et al. | 192/36 |
| 5,992,592 A | 11/1999 | Showalter | 192/43.1 |
| 6,000,510 A | 12/1999 | Kirkwood et al. | 192/3.29 |
| 6,062,361 A | 5/2000 | Showalter | 192/38 |
| 6,109,410 A | 8/2000 | Costin | 192/46 |
| 6,116,024 A | 9/2000 | Rottino | 60/345 |
| 6,149,543 A | 11/2000 | Breen | 475/269 |
| 6,155,395 A | 12/2000 | Braford, Jr. | 192/48.3 |
| 6,186,299 B1 | 2/2001 | Ruth | 192/46 |
| 6,210,300 B1 | 4/2001 | Costin et al. | 475/294 |
| 6,244,407 B1 | 6/2001 | Kremer et al. | 192/70.12 |
| 6,244,965 B1 * | 6/2001 | Klecker et al. | 464/81 |
| 6,251,045 B1 | 6/2001 | Oliveira et al. | 477/124 |

FOREIGN PATENT DOCUMENTS

WO    WO 99/45289    9/1999

* cited by examiner

*Primary Examiner*—Richard M. Lorence
(74) *Attorney, Agent, or Firm*—Bliss McGlynn, P.C.; Greg Dziegielewski

(57) ABSTRACT

A bi-directional clutch assembly of the present invention is provided that comprises an inner race, an outer race, and an engagement mechanism disposed between said inner race and said outer race. The engagement mechanism is operable to move between a disengaged position wherein the inner and outer races may freely rotate relative to one another and an engaged position wherein the inner and outer races are locked so as to translate torque therebetween. The present invention also includes at least one actuator that is operatively connected to the engagement mechanism and responsive to a first momentary control force to selectively move the engagement mechanism to the engaged position and to hold the engagement mechanism in the engaged position after the first control force has been terminated. The actuator is further responsive to a sequentially applied second momentary control force to move the engagement mechanism to the disengaged position and to hold the engagement mechanism in the disengaged position after the second control force has been terminated and pending the selective application of a sequentially applied first control force.

17 Claims, 6 Drawing Sheets

BI-DIRECTIONAL CLUTCH HAVING A MOMENTARY LATCHING ACTUATOR

BACKGROUND OF THE INVENTION

1. Field of the Invention

The present invention relates, generally to bi-directional overrunning clutch assemblies and, more specifically, to a bi-directional clutch having a selectively controllable engagement assembly that is driven by an actuator that is operatively controlled by a momentary actuating force.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets, which may include an inner gear, intermediate planet or pinion gears that are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission, transfer case or differential or the like. In addition, multi-disc friction devices also find use in industrial applications, such as wet brakes, for example, to brake the wheels on earth-moving equipment.

The multi-disc pack clutch or brake assembly has a clutch sub-assembly including a set of plates and a set of friction discs that are interleaved between one another. The plates and friction discs are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission, transfer case, or differential to provide various gear ratios in operation, or to brake a component.

When the discs are not engaged, there often remains a differential rotational speed of the drive and driven members which the clutch or brake bridges. Relative rotation between the friction discs and the plates during open-pack mode creates drag. This condition results in parasitic energy losses, reduces the efficiency of the transmission, transfer case or differential, and ultimately results in lower fuel efficiency.

In addition to multiple friction devices, one-way clutches are frequently employed in transmissions, transfer cases, and differentials to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Still, the clutch is necessary for providing the proper holding torque in low and reverse gears. Accordingly, there remains a need in the art for a mechanism that can provide the appropriate holding torque for both low and rear gears in the transmission and yet results in less parasitic losses which are presently attributable to the multiple plate friction clutch used for this purpose. In addition, there is a need in the art for a device that continues to perform the functions of the one-way clutch as described above, particularly where the output speed of the transmission exceeds the input speed resulting in engine compression braking.

One-way clutches have also been employed in transfer cases that provide full time, part time, and "on demand" four wheel drive (4WD) capabilities. In these situations, the one-way clutch is typically disposed between the primary driveline and the secondary driveline. When the primary drive line attempts to over speed the secondary drive line, as will occur, for example, where the rear wheel is supported on a slick surface, such as ice and is spinning and the front wheels are solidly supported, the one-way clutch engages and transfers torque to the slipping wheel. In this way, 4WD is achieved, but in this case, only under circumstances that require it.

The use of a one-way overrunning clutch to selectively provide drive torque to a secondary driveline upon primary wheel slip has not, however, become a popular solution to part time 4WD vehicle requirements because of one problem: the clutch remains disengaged or inactive when reverse gear is selected unless, of course, the secondary driveline attempts to over speed the primary driveline. Thus, in a situation frequently requiring 4WD, that is, when the vehicle may need to be rocked or simply backed over terrain, a 4WD configuration utilizing a one-way overrunning clutch will simply not provide 4WD operation. This is a significant drawback of this clutch configuration.

Partially in response to this problem, bi-directional overrunning clutches have been proposed in the related art for use in these circumstances. These bi-directional overrunning clutch assemblies typically employ an inner race, an outer race, and a plurality of rollers as the engagement mechanism disposed therebetween. The bi-directional overrunning clutches of the prior art are, for the most part, designed to be self-actuating. While they appear to present a solution to certain problems identified above they have not been widely employed in transmission, transfer cases, and differentials of the related art. These self-actuating bi-directional overrunning clutches are relatively mechanically complex and have certain physical limitations and drawbacks. One such drawback is that the existing bi-directional clutches have a large angular distance from the engagement in one rotational direction to the engagement in the opposite rotational direction. This makes for undesirable driving conditions by causing hard lockups when changing directions and also brings about a short mechanical life due to the severe inherent impact forces of the engagement. Additionally, the self-actuating bi-directional clutches known in the related art cannot be selectively engaged in an efficient manner or to optimize the vehicle power output in response to varying driving conditions.

Accordingly, selectively actuated bi-directional clutches have evolved that can be actuated and controlled in a manner to provide driving comfort and offer efficient operating modes for various driving conditions while eliminating the need for conventional multi-disc friction devices. These selectively actuated and controlled bi-directional clutches provide torque translation in either rotational direction and have been considered as a substitute for conventional multi-disc friction devices presently known in the related art in certain applications. However, there still exists room for further improvements in the manner in which these devices are selectively actuated.

Currently, these selectively actuated bi-directional clutches may employ either rollers that interact with narrowed disc surfaces or pawl and ratchet (i.e. teeth) engagement assemblies. Typically, a pawl-type engagement assembly is used where angular accuracy is required in the engagement. More specifically, the pawl-type selectively actuated bi-directional clutches are operatively controlled by actuating devices that rotate an actuator disc assembly in a manner to cause a set of engagement pawls to either engage or disengage an inner race to an outer race. In turn, the actuating discs are responsive to an electromagnetic, hydraulic, or other force generating medium to move the pawls between their operative modes. Since these clutches are bi-directional, there are generally two sets of engagement pawls and two actuator discs. While this arrangement works well, it requires that the actuating force that rotates the actuator discs remain constantly active to hold the respective actuator discs in position. This has certain drawbacks and can cause particular operative problems.

For example, if the actuating discs of the current type of bi-directional clutch are each controlled by a solenoid, then electrical power must be applied and constantly maintained to each of the solenoids to first actuate and to then hold the discs in position. If the electrical power to the solenoid is not maintained, the actuator discs may move in an uncontrolled manner to the opposite engagement position or to some point in-between. In either case, an uncontrolled movement could be physically devastating to the clutch and its components and possibly other parts of the drivetrain. At a minimum, an uncontrolled actuation of one, or both of the actuating discs would cause undesirable actions within the transfer case, or transmission, or other device in which the clutch may be installed. This is problematic when one considers that any minor drop off in electrical power, or the occurrence of some type of momentary or prolonged electrical break would cause the actuator discs to be uncontrolled and free to randomly move. Likewise, hydraulically controlled actuator discs suffer the same problem if a fluctuation, or drop off in hydraulic force where to occur.

A secondary consideration of selectively activated bi-directional clutches is that maintaining the electrical, or hydraulic pressure to the actuator requires a constant expenditure of energy. Thus, there is a constant load to the electrical or hydraulic system to provide the constant engagement force. This is a power requirement that must be accounted for in the design of the electrical or hydraulic support system, which ultimately adds to the size and cost of these systems. Therefore, there exists a need in the art for a selectively actuated and controlled bi-directional clutch that utilizes an actuator which holds the actuating discs in position and does not require a constantly applied force to maintain the actuator discs in their desired positions.

SUMMARY OF THE INVENTION

The disadvantages of the related art are overcome by the bi-directional clutch assembly of the present invention that comprises an inner race, an outer race, and an engagement mechanism disposed between said inner race and said outer race. The engagement mechanism is operable to move between a disengaged position wherein the inner and outer races may freely rotate relative to one another and an engaged position wherein the inner and outer races are locked so as to translate torque therebetween. The present invention also includes at least one actuator that is operatively connected to the engagement mechanism and responsive to a first momentary control force to selectively move the engagement mechanism to the engaged position and to hold the engagement mechanism in the engaged position after the first control force has been terminated. The actuator is further responsive to a sequentially applied second momentary control force to move the engagement mechanism to the disengaged position and to hold the engagement mechanism in the disengaged position after the second control force has been terminated and pending the selective application of a sequentially applied first control force.

Thus, the bi-directional clutch of the present invention overcomes the drawbacks of prior art clutches by being operable to selectively switch between the various modes of engagement by the momentary application of a control force. If one of the latching actuators is in the latched position, a single momentary application of a control force, in conjunction with constant return biasing force of the actuator will cause the actuator to index to its return position and remain there. If one of the latching actuators is in the return position, another single momentary application of the same control force, in conjunction with constant return biasing force of the actuator will cause the actuator to index to its latched position. This rapid and efficient change between the positions of the latching actuators moves the engagement mechanism of the clutch between its engagement modes. Therefore, the bi-directional clutch of the present invention moves between the modes of engagement efficiently and with great energy conservation. The latching feature of the actuators of the present invention provide further energy conservation and increases in efficiency by eliminating the need for a constant application of control force which also prevents clutch failures by maintaining the selected position in the absence of a constantly supplied control force.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

A bi-directional clutch assembly of the present invention having a latching actuator is generally indicated at 10 in the figures, where like numerals are used to designate like structure throughout the drawings. In the preferred embodiment illustrated herein, the clutch assembly 10 is operative in four different modes and is particularly adapted for use as a component of drivelines of land-based vehicles, such as in transmissions, transfer cases, differentials and the like. Accordingly, one application for the clutch assembly 10 of this particular type (i.e., having four operational modes) is for use in a motor vehicle transmission. However, those having ordinary skill in the art will appreciate that the clutch assembly 10 of the present invention may be employed in numerous applications, whether or not the application takes advantage of all four operational modes of the clutch assembly as discussed below.

Figure 1:
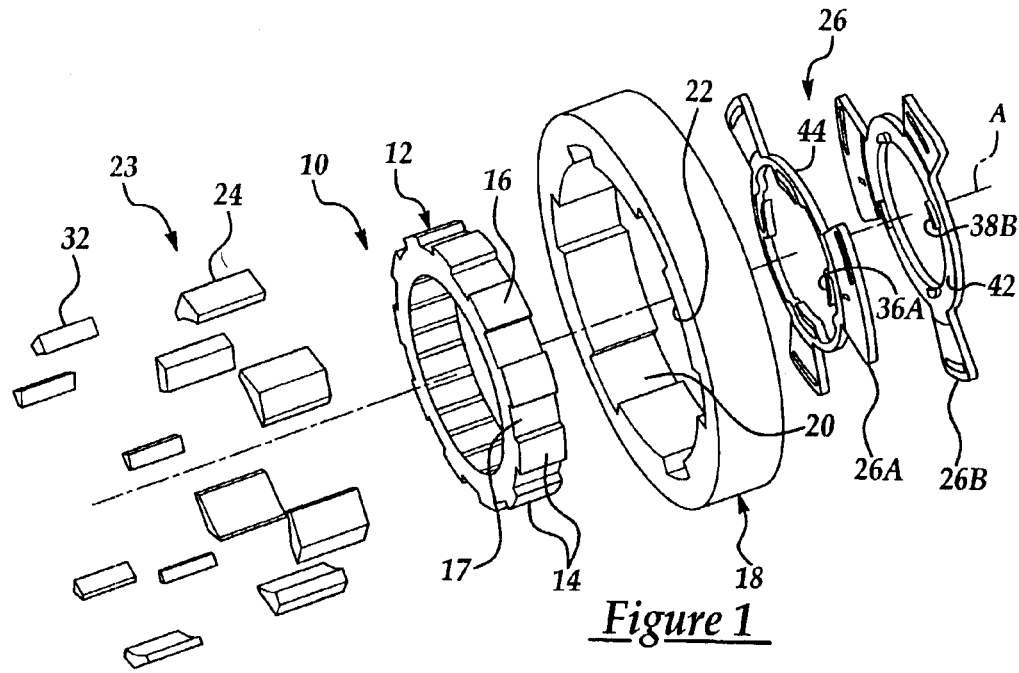
FIG. 1 is a partial exploded view of the bi-directional clutch of the present invention illustrating the engagement mechanism.

Referring now to FIG. 1, the clutch assembly 10 of the present invention includes an inner race, generally indicated at 12, and an outer race, generally indicated at 18 disposed concentrically about the inner race 12. The inner race 12 has a plurality of torque translating engagement teeth 14 disposed about the circumference of the outer diameter 16 of the inner race 12. The roots 17 of the teeth 14 are defined between adjacent teeth 14. The outer race includes a plurality of cavities, generally indicated at 20, formed circumferentially about the inner diameter 22 of the outer race 18. An engagement mechanism, generally indicated at 23, includes a plurality of pawls 24 that are supported within the cavities 20 of the outer race 18 and between the inner and outer races 12, 18, respectively. The engagement mechanism 23 is operable to move between a disengaged position wherein the inner and outer races 12, 18, may freely rotate relative to one another, and an engaged position wherein the inner and outer races 12,18 are locked so as to translate torque therebetween. Those having ordinary skill in the art will appreciate that, while a number of different types of engagement members may be employed within the scope of the present invention, in the preferred embodiment for the clutch assembly, the engagement members are pawls 24.

Figure 2:
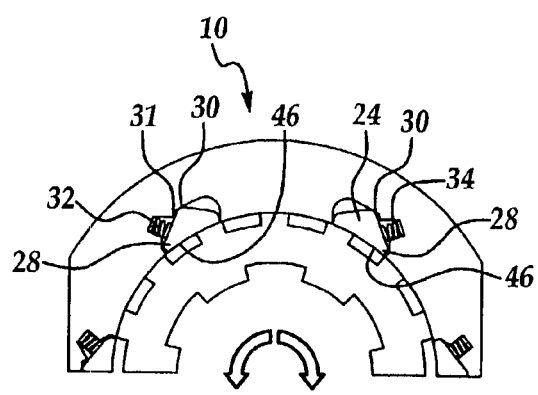
FIG. 2 is an enlarged partial side view of the bi-directional clutch of the present invention illustrating one of the four modes of operation where both sets of pawls are disengaged such that the clutch may freewheel in both directions.

As shown in FIG. 2, there are two sets of pawls 24. One set allows the inner and outer races 12, 18 to engage such that the relative rotation of the engaged races will cause a forward movement of the vehicle in which the clutch 10 is installed. Thus, one set of pawls 24, as indicted in FIGS. 2–6, are denoted as forward pawls, or forward engagement members 24A. Concomitantly, the engagement of the opposing, or second set of pawls will allow for reverse movement and are therefore denoted as the reverse pawls, or reverse engagement members 24B. It should be appreciated that denoting one of the two sets of pawls 24 as "forward" and the other set as "reverse" is merely a relative designation dependant on the transmission shafts to which the clutch is attached and their relative rotational direction to achieve either a forward or reverse movement of the vehicle. In other words, the two sets of pawls 24A and 24B are identical and simply opposed to achieve the bi-directional function of the clutch.

Furthermore, while the pawls 24 may have any suitable geometric shape, as illustrated, for example, in FIGS. 2–5, the pawls 24 have a generally triangular shape when viewed from the side. The pawls 24 are received in the cavities 20 formed in the inner diameter 22 of the outer race 18 and are supported in circumferentially spaced orientation about the rotational axis A of the clutch assembly 10. In addition, as best shown in FIG. 1, each pawl 24 defines a longitudinal axis that extends in the direction of the rotational axis A. Each pawl 24 has a nose portion 28 and a fulcrum portion 30 formed thereon. The fulcrum portion 30 is adapted to provide pivoting motion relative to a corresponding surface 31 defined by the cavity 20. A biasing member 32 is also captured in an axially extending recess 34 formed in each cavity 20. The biasing member 32 provides a biasing force between the outer race 18 and the pawl 24 to bias the nose portion 28 of the pawl 24 into engagement with a torque-translating tooth 14 formed on the outer diameter 16 of the inner race 12. In the preferred embodiment, the biasing member 32 is a Z-shaped spring having a longitudinal axis which corresponds to the longitudinal axis of the associated pawl 24 and is disposed within the special recess 34 so as to be substantially parallel with the rotational axis A of the clutch assembly 10. However, those having ordinary skill in the art will appreciate that any number of biasing members known in the related art may be suitable for this purpose. Each adjacent pawl 24 is supported by its associated cavity 20 such that the nose portion 28 of each adjacent pawl 24 is pointed, generally, in the opposite direction. In other words, adjacent pawls 24 are oriented in opposite directions such that the forward pawls 24A and the reverse pawls 24B are supported adjacently relative to each other about the races 12, 18. In this way, every other pawl (24A and 24B) is disposed to selectively provide torque translation in opposite rotational directions.

Figure 3:
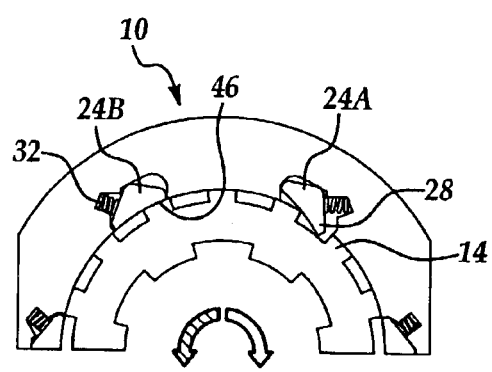
FIG. 3 is an enlarged partial side view of bi-directional clutch of the present invention illustrating another of the four modes of operation where a first set of pawls is engaged so as to provide torque translation in one direction but allow freewheeling movement in the opposite rotational direction.
Figure 4:
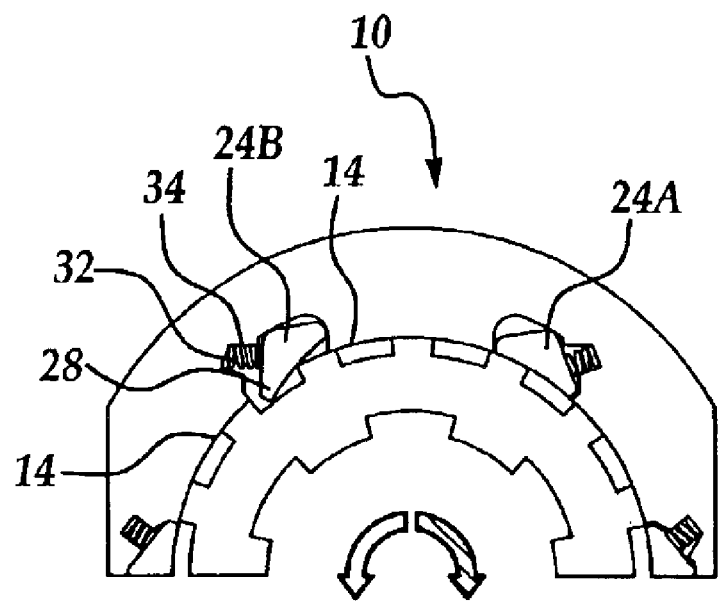
FIG. 4 is an enlarged partial side view of bi-directional clutch of the present invention illustrating a third mode of operation where a second set of pawls is engaged to provide torque translation in the opposite rotational direction as illustrated in FIG. 3 but to allow freewheeling movement between the inner race and the outer race in the rotational direction opposite to that in which torque is translated in this mode.
Figure 5:
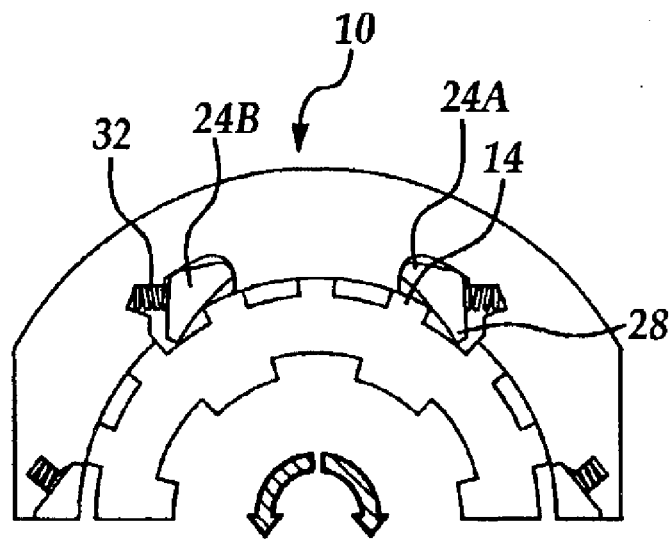
FIG. 5 is an enlarged partial side view of bi-directional clutch of the present invention illustrating a fourth mode of operation wherein both sets of pawls are engaged so that the inner and outer races are locked relative to each other and torque is translated in both rotational directions.

The engagement assembly 23 further includes at least one actuating disc, generally indicated at 26 in FIG. 1. The actuating disc 26 is operatively connected to the engagement members 24 to provide four separate modes of operation between the inner and outer races 12, 18 of the clutch assembly 10. More specifically, the actuating disc 26 is operable to (1) disengage the two sets of engagement members 24 to provide freewheeling between the inner and outer races 12, 18 in both rotational directions (as shown in FIG. 2); (2) to actuate one set of the engagement members (forward pawls 24A) so that torque is translated in one rotational direction but to allow freewheeling in the opposite rotational direction as shown in FIG. 3; (3) to actuate the opposing set of engagement members (reverse pawls 24B in FIG. 4) so that torque is translated in a direction opposite to that in mode (2) above, but allow freewheeling in the rotational direction opposite to that in which torque is translated in this mode; and (4) to actuate both set of engagement members (forward and reverse pawls 24A and 24B) so that the inner and outer races 12, 18 are locked relative to each other and torque is translated in both rotational directions (FIG. 5).

Preferably, the clutch assembly 10 includes a pair of actuating discs 26 as shown as 26A and 26B in FIG. 1. In the preferred embodiment of the present invention, the discs 26A, 26B are nested with respect to each other and located on one side or the other of the clutch assembly. However, it should be appreciated that the discs 26A, 26B may also be disposed on either side of the inner and outer races 12, 18. Each of the discs 26A or 26B may be selectively indexed to bring one set of pawls 24 into an engaged or disengaged position. When a nested configuration is employed, there is a first disc 26A, shown in FIG. 7A, and a second disc 26B, shown in FIG. 7B. First disc 26A is disposed against the inner and outer races 12, 18 with the second disc 26B disposed against the first disc 26A. The two discs have a slightly different structure to allow the actuator discs 26A, 26B to nest and still operatively interact with the engagement pawls 24 as will be described in greater detail below.

Figure 6:
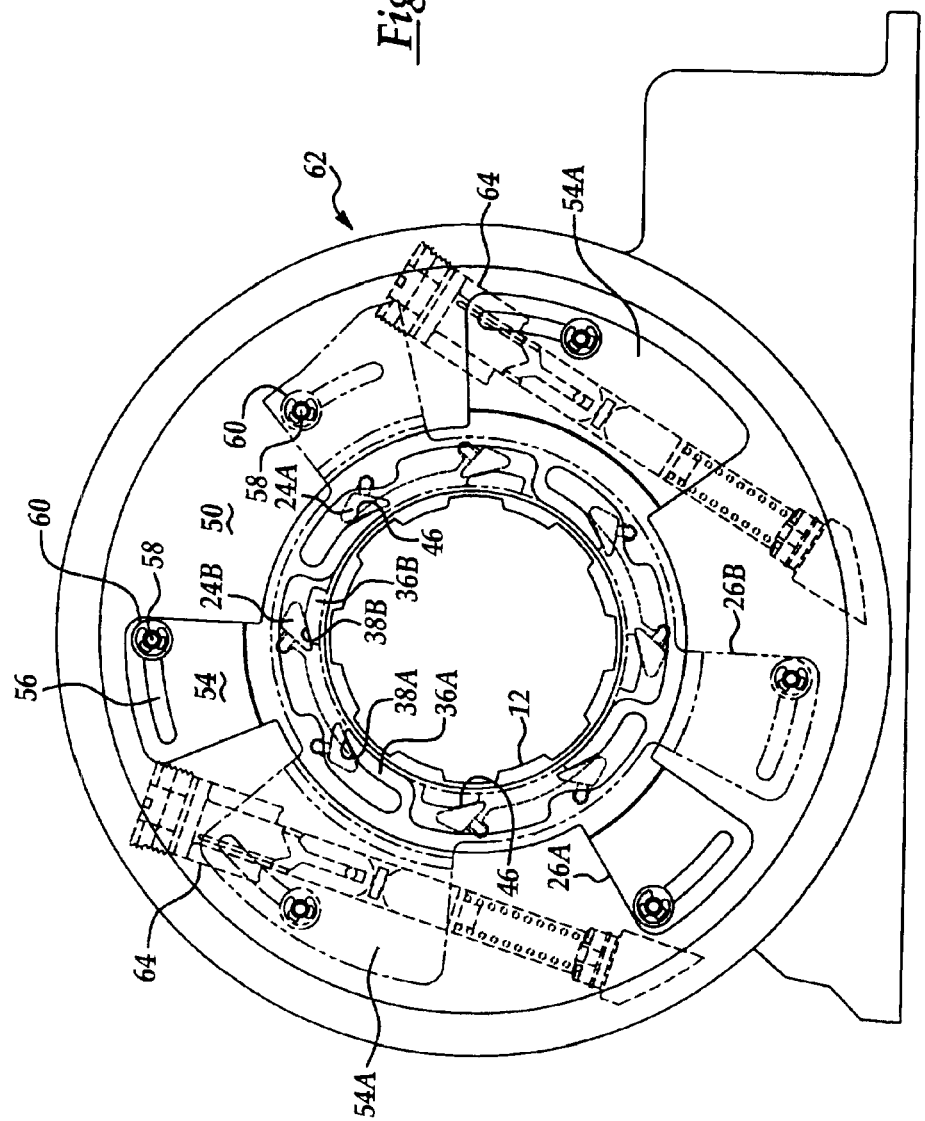
FIG. 6 is a side view of the bi-directional clutch of the present invention illustrating the latching actuators and actuating discs and their interaction with the pawls of the bi-directional clutch.
Figure 7A:
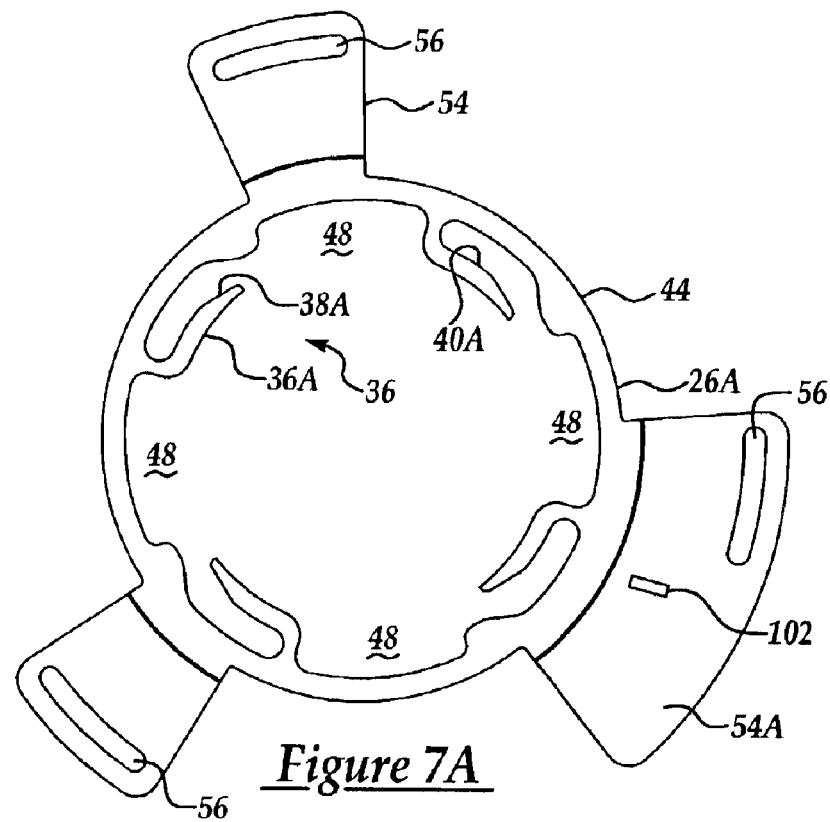
FIG. 7A is a side view of one of the actuating discs of the bi-directional clutch of the present invention having clockwise oriented disengagement tangs where a set of pawls will be disengaged by a clockwise movement of the disc relative to the outer race.
Figure 7B:
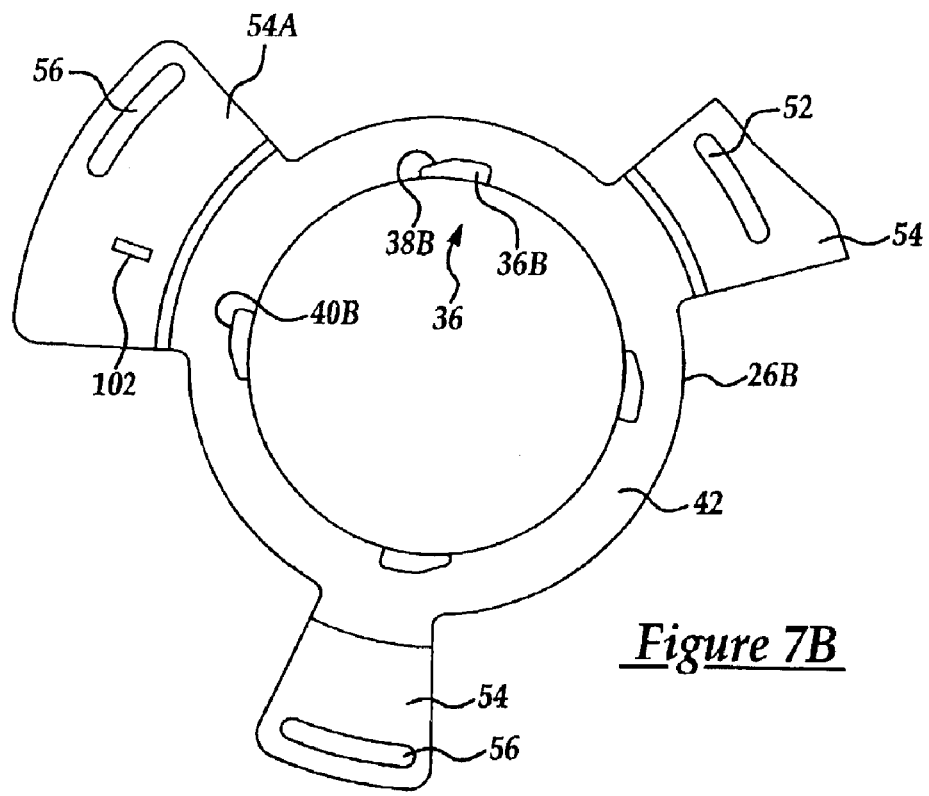
FIG. 7B is a side view of one of the actuating discs of the bi-directional clutch of the present invention having counter-clockwise oriented disengagement tangs where a set of pawls will be disengaged by a counter-clockwise movement of the disc relative to the outer race.
Figure 7C:
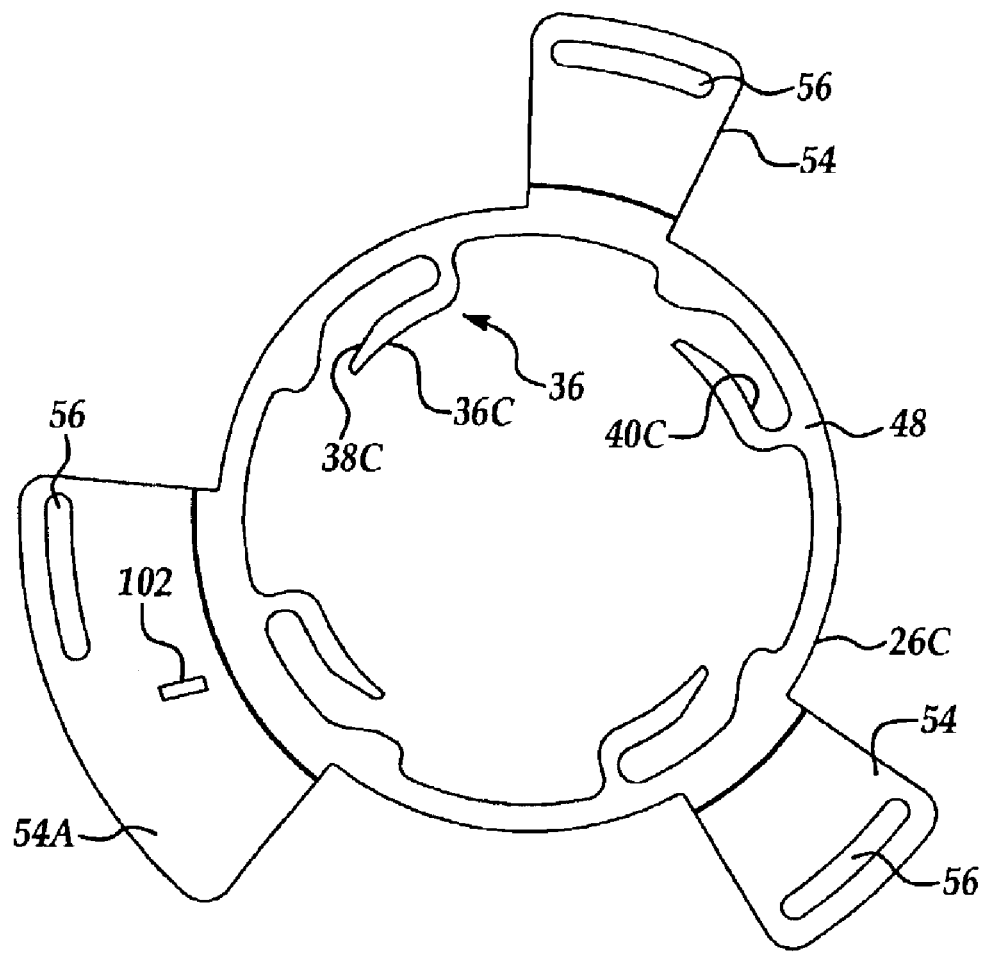
FIG. 7C is a side view of one of the actuating discs of the bi-directional clutch of the present invention having counter-clockwise oriented disengagement tabs where a set of pawls will be disengaged by a counter-clockwise movement of the disc relative to the outer race.

Each actuator disc 26 includes disengagement portions, generally indicted at 36, in FIGS. 6 through 7C, spaced about the inner diameter thereof. As best shown in FIG. 7A, the disengagement portions 36 of the first actuating disc 26A include a plurality of tangs 36A that extend inward from the inner diameter of the disc. The disengagement tangs 36A curve arcutately to follow the curve of the disc's inner diameter and have an angular slope 38A on their open ends and a pawl supporting surface 40A. As best shown in FIG. 7B, the disengagement portions 36 of actuating disc 26B include a plurality of disengagement tabs 36B that extend laterally outward from the front face 42 of the disc and have an angular slope 38B and a pawl support surface 40B. In the preferred embodiment of the present invention, as shown in FIG. 1, actuating discs 26A and 26B are nested together so that actuating disc 26A is disposed proximate to the inner and outer races 12, 18 and the front face 42 of actuating disc 26B is in contact with the rear face 44 of actuating disc 26A.

The disengagement tangs 36A of actuating disc 26A are operatively disposed against the inner and outer races 12, 18 of the clutch assembly 10 such that each of the angular slopes 38A and pawl supporting surfaces 40A are pictured on the bottom surface 46 of each of the forward set of pawls 24A (FIG. 6). In this manner, each of the forward pawls 24A ride on the angular slope 38A and the pawl support surface 40A of each of the disengagement tangs 36A of the actuating disc 26A as the disc is caused to rotatably index. More specifically, when the nose portion 28 of a forward pawl 24A is in contact with a tooth 14 of the inner race 12, thereby operatively engaging the inner race 12 to the outer race 18, the actuating disc 26A is oriented so that the bottom surface 46 of the forward pawl 24A is resting on the angular slope 38A of the disengagement tang 36A. Further, when the actuating disc 26A is caused to index clockwise, the bottom surface 46 of the forward pawl 24A is forced to ride up the angular slope 38A and onto the pawl support surface 40A thereby rotating the forward pawl 24A and bringing the nose portion 28 out of engagement with the inner race 12 and disengaging the inner race 12 from the outer race 18. In FIG. 6, the teeth 14 of the inner race 12 are not shown to provide clarity in illustrating the interaction between the actuator discs 26 and the pawls 24.

It should be appreciated that the indexing rotation of the actuating disc 26A occurs as only a relative portion of a total angular revolution and is a movement relative to the outer race 18, which retains the pawls 24. Likewise, with the forward pawls 24A disengaged, a counter-clockwise indexing rotation of the actuating disc 26A allows the biasing member 32 of each forward pawl 24A to force at least one pawl 24A back into engagement with the inner race as the pawl 24A rides along the pawl supporting surface 40A and down the angular slope 38A of the disengagement tang 36A. Thus, it should also be appreciated that the number of the plurality of disengagement tangs 36A is equal to the number of the plurality of forward pawls 24A such that all forward pawls 24A are simultaneously disengaged or engaged by the indexing of the actuating disc 26A.

As shown in FIG. 6, in a similar manner, the raised disengagement tabs 36B extend outward from the front face 42 of actuating disc 26B (also see FIG. 1) into the open areas 48 of disc 26A so that the angular slope 38B and pawl support surface 40B of the tabs 36B ride along the bottom surface 46 of the reverse pawls 24B. The disengagement tabs 36B will cause the reverse pawls 24B to be disengaged from the inner race 12 as the actuating disc 26B is indexed in a clockwise rotation. Thus, in the preferred embodiment of the present invention, as illustrated in FIGS. 1 and 6 with reference to the actuating discs 26A and 26B as shown in FIGS. 7A and 7B, a clockwise indexing actuation of disc 26A will cause the forward pawls 24A to be disengaged and a counter-clockwise indexing actuation of disc 26B will cause the reverse pawls 24B to disengage. It should be appreciated that the orientation of the disengagement tangs 36A and the disengagement tabs 36B may also be in the opposite rotational direction, such that a counter-clockwise indexing actuation of disc 26A will cause the forward pawls 24A to be disengaged and a clockwise indexing actuation of disc 26B will cause the reverse pawls 24B to disengage.

Thus, the actuating discs 26 operate to control the disengagement of the pawls 24 of the bi-directional clutch 10. Specifically, as shown in FIGS. 2 through 5 (with reference to FIG. 6), the open rotational arrows indicate a freewheel movement of the inner race 12 relative to the outer race 18 and the crosshatched rotational arrows indicate engagement and torque translation. When both of the actuating discs 26 are actuated so that the bottom surfaces 46 of all the pawls 24 are resting on the supporting surfaces 40A and 40B of the respective disengagement portions 36, then the clutch assembly 10 will freewheel in both directions as illustrated in FIG. 2. When either one of the actuating discs 26 are actuated so that the bottom surfaces 46 of the respective pawls 24 are resting on the supporting surfaces 40A or 40B of the respective disengagement portions 36, then the clutch assembly 10 will freewheel in that particular direction as illustrated in FIGS. 3 and 4. On the other hand, when neither of the actuating discs 26 are actuated so that the bottom surfaces 46 of the all the pawls 24 are resting on the sloping portions 38A and 38B of both actuating discs 26, then the nose portion 28 of at least one pawl 24 is biased into engagement with a corresponding tooth 14 formed on the outer diameter 16 of the inner race 12. When at least one pawl in both sets of pawls 24A and 24B are engaged in this manner, the inner and outer races 12, 18 are locked together and torque is translated in both rotational directions as illustrated in FIG. 5.

In another non-limiting embodiment of the present invention, a mirror image of actuating disc 26A may be substituted for actuating disc 26B. The mirror image actuating disc is illustrated in FIG. 7C and is denoted as 26C. Actuating disc 26C has the same type of disengagement tangs as actuating disc 26A but they are oriented in the opposite direction. Thus, the disengagement tangs 36C of actuating disc 26C have an angular slope 38C and a pawl supporting surface 40C that support the bottom surface 46 of the reverse pawls 24B and cause the reverse pawls 24B to be disengaged by a counter-clockwise indexing rotation, when actuating disc 26C is nested with actuating disc 26A. It should be appreciated that this configuration requires that the ends of the reverse pawls 24B extend longitudinally far enough from the outer race 18 through the open areas 48 of actuating disc 26A to reach the disengagement tangs 36C of actuating disc 26C. If this is the case, it should be further appreciated that actuating disc 26C may merely be a second disc 26A turned over to operate in this context. However, in another non-limiting embodiment, the disengagement tangs 36C of actuating disc 26C may be bent inward, or otherwise laterally displaced, toward the outer race 18 into the open areas 48 of actuating disc 26A to reach the reverse pawls 24B negating the requirement to lengthen them.

In this way, the bi-directional clutch 10 of the present invention may be operatively controlled to actuate the engagement members to provide four separate modes of operation between the inner and outer races of the clutch assembly. More specifically, the actuating disc is controlled to operatively (1) disengage the engagement members to provide freewheeling between the inner and outer races in both rotational directions (as shown in FIG. 2); (2) to actuate at least one of the engagement members so that torque is translated in one rotational direction but to allow freewheeling in the opposite rotational direction as shown in FIG. 3; (3) to actuate at least one of the engagement members so that torque is translated in a direction opposite to that in mode (2) above, but allow freewheeling in the rotational direction opposite to that in which torque is translated in this mode (FIG. 4); and (4) to actuate at least one of the engagement members so that the inner and outer races are locked relative to each other and torque is translated in both rotational directions as shown in FIG. 5. However, in the preferred embodiment illustrated in FIG. 6, the outer race 18 is either permanently retained in, or is a physical part of the main body 50 of the bi-directional clutch, which may be operatively supported in a fixed manner within a larger device that is part of the drivetrain of a motor vehicle. Thus, in the second and third modes described above, this particular use of the bi-directional clutch 10 of the present invention locks the inner race 12 to the outer race 18, and thereby to the main body of the device, precluding torque transfer in the locked direction, since the outer race is fixed but allowing freewheeling in the opposite direction. In the fourth above-mentioned mode, the inner race 12 will be locked in both directions to the outer race 18 thereby precluding any rotation movement.

When the outer race 18 is a fixed stationary piece, the two nested actuating discs 26 are retained relative to the main body 50 through the use of a plurality of pins, arcuate slots, and retaining clips. Thus, as shown in FIGS. 6, 7A, 7B, and 7C, the actuator discs 26 include a plurality of extending tabs 54, each having an arcuate slot 56. As will be discussed in greater detail below, one of the extending tabs 54A is larger than the others to accommodate a connection to the actuating assembly. The plurality of arcuate slots 56 are received by a like plurality of pins 58 extending from the main body 50 of the clutch 10. As discussed above, the actuating discs 26 are disposed against the inner and outer races 12, 18 of the bi-directional clutch 10. More specifically, the actuating discs 26 are captured in nesting fashion against the main body 50 of the clutch 10 by retaining clips 60 lockingly supported on the ends of the pins 58. The clips 60 may be of any of a known variety of fixed retaining devices and by way of example are illustrated in FIG. 6 as a press-fit "E" type clip. Thus, while being retained against the inner and outer races 12, 18 of the clutch 10, the rotational travel of each of the actuating discs 26 is set by the angular length of the arcuate slots 56.

To operatively control the movement of the actuating discs 26, the present invention also includes at least one actuator assembly generally indicated at 62 in Figure. The actuator assembly 62 is operatively connected to the actuator discs 26 of the engagement mechanism 23. As will be described in greater detail below, the actuator assembly 62 is responsive to a first momentary control force to selectively move the engagement mechanism 23 to the engaged position and to hold the engagement mechanism 23 in the engaged position after the first control force has been terminated. The actuator assembly 62 is further responsive to a sequentially applied second momentary control force to move the engagement mechanism 23 to the disengaged position and to hold the engagement mechanism 23 in the disengaged position after the second control force has been terminated and pending the selective application of a sequentially applied first control force.

Figure 8A:
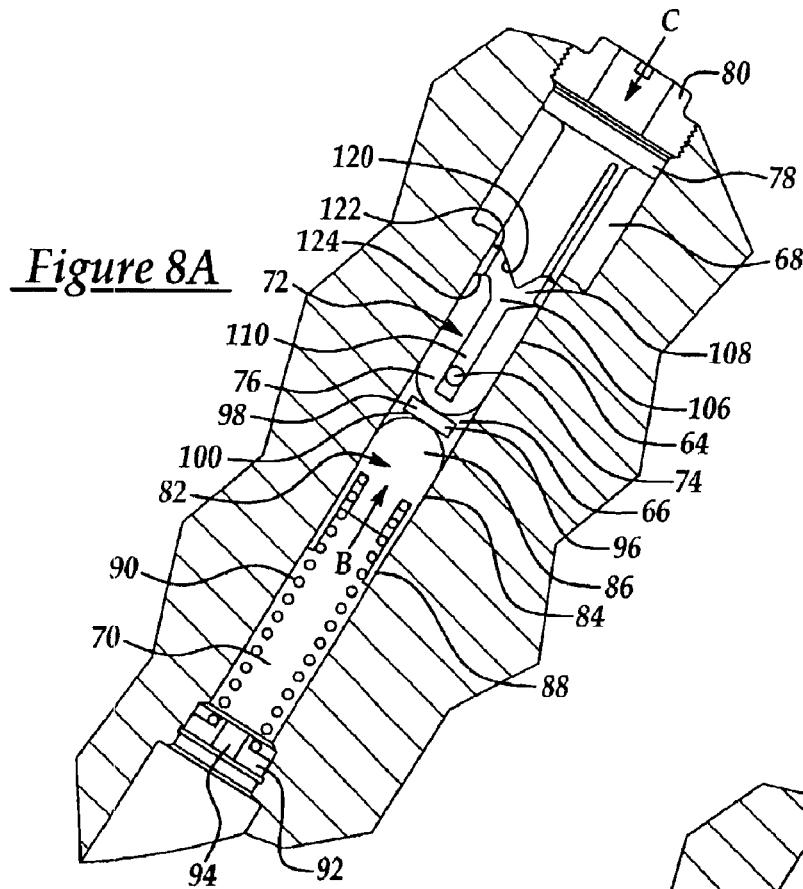
FIG. 8A is a side view of a latching actuator of bi-directional clutch of the present invention illustrated in the de-energized position.
Figure 8B:
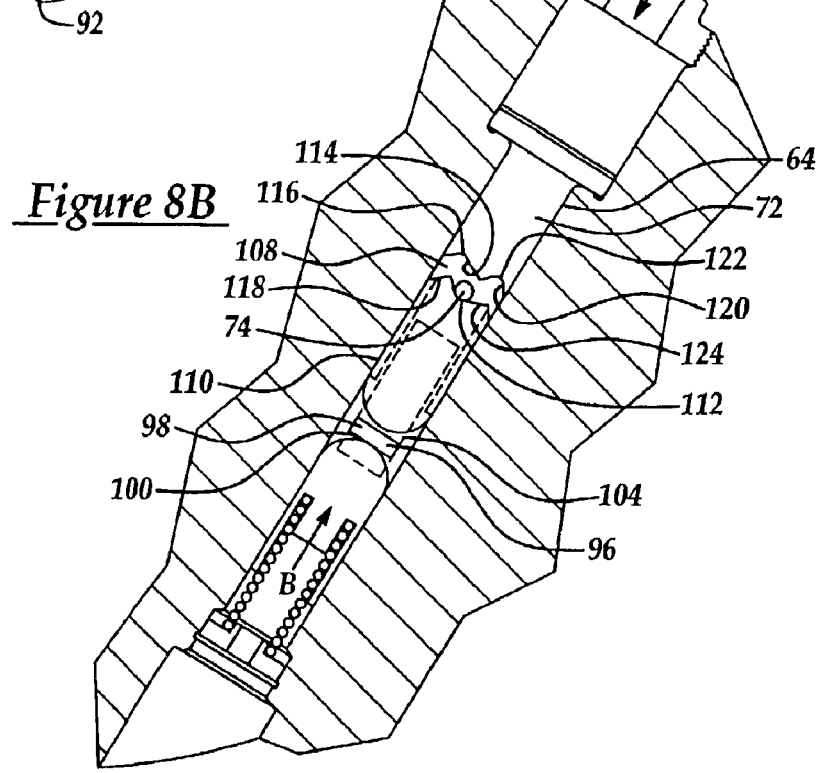
FIG. 8B is a side view of a latching actuator of bi-directional clutch of the present invention illustrated in the energized position

In the preferred embodiment of the present invention the actuator assembly 62 includes two latching actuator assemblies 64, each operatively controlling one of the two actuating discs 26. As best shown in FIGS. 8A and 8B, each latching assembly 64 includes an actuator bore 66 which has an adjacent end 68 and a distal end 70. An actuating piston, generally indicated at 72, is slidingly supported within the actuator bore 66 proximate to the adjacent end 68. The actuating piston 72 is responsive to the application of a first and second control force. As will be discussed below, FIG. 8A depicts the latching actuator 64 in its return position and FIG. 8B depicts the latching actuator 64 in the latched position. The return position of the latching actuators 64 corresponding to the engaged position of the actuating discs 26 and the latched position of the latching actuators 64 corresponding to the disengaged position of the actuating discs 26. At least one pin 74 extends from the inner circumference of the actuator bore 66 and is adapted to operatively interact with the actuating piston 72. The actuating piston 72 further includes an actuating head 76 and a plunger end 78 that is distal from the actuating head 76. The plunger end 78 of the actuating piston 72 is supported within the actuator bore 66 proximate to the adjacent end 68 of the actuator bore 66 such that the first and the second control forces operatively act upon the plunger end 78 to move the actuating piston 72 within the actuator bore 66 as will be described in greater detail below.

The first and second control forces are momentary physical forces, such as a hydraulic fluid force, or an electromotive force, that are selectively applied to the plunger end 78 of the actuating piston 72 within the adjacent end 68 of the actuator bore 66, as represented by the arrow "C" in FIG. 8A and 8B. The first and second control forces both provide a selectively applied force in the same direction but at different times to cause the latching actuator 64 to selectively move the engagement mechanism 23 of the bi-directional clutch 10 between the engaged and disengaged positions. By way of non-limiting example, if the first and second forces are hydraulic fluid forces, they would be applied to the actuating piston 72 in the actuating bore 66 through a bore end cap 80 that is threadingly inserted into the adjacent end 68 of the actuator bore 66 and is adapted to receive the fluid force. The bore end cap 80 would serve as a securing point for the physical connection to a source of fluid force. The fluid connection to a source of selectively controlled hydraulic force such as by tubing or other delivery means is beyond the scope of this application and is not illustrated but is well known in the related art.

The latching actuator assembly 64 further includes a return piston assembly, generally indicated at 82. The return piston assembly 82 moves in response to movement of the actuating piston 72 and generates a force acting in the direction opposite to the first and second control forces. The return piston assembly 82 is slidingly supported within the actuator bore 66 proximate to the distal end 70 and includes a return piston 84 having a return head 86 opposite the actuating head 76 of the actuating piston 72. The return piston assembly also includes a biased end 88 distal from the return head 86 with the biased end 88 of the return piston 84 proximate to the distal end 70 of the actuator bore 66. A biasing member 90 is operatively supported between the distal end 70 of the actuator bore 66 and the biased end 88 of the return piston 84. The biasing member 90 acts to provide a constant biasing force, represented by arrow "B" in FIGS. 8A and 8B, which is in opposition to the first and the second control forces as they are applied to the actuating piston 72. The distal end 70 of the actuator bore 66 is closed by an end plug 92 that receives and retains one end of the biasing member 90. The end plug 92 is necessary to close the distal end 70 of the actuator bore 66, which is left open from the manufacturing drilling process. The end plug 92 also includes a vent opening 94 that prevents pressure build up under the return piston 84.

A lever 96 is disposed between and is in operable contact with the actuating head 76 of the actuating piston 72 and the return head 86 of the return piston 84 and is movable with both the actuating piston 72 and the return piston assembly 82. The lever 96 further includes a driven end 98 and a driving end 100 (FIGS. 8A and 8B). As best seen in FIG. 6, the lever 96 is operatively interconnected with the actuator disc 26 such that movement of the actuating piston 72 and the return piston assembly 82 moves the disc 26 and the engagement mechanism 23 between the engaged and disengaged positions. Specifically, the driven end 98 of the lever 96 is disposed within the actuator bore 66 between and in operative communication with both the actuating head 76 of the actuating piston 72 and the return head 86 of the return piston 84, and the driving end 100 is operatively connected to the actuator disc 26. Thus, the application of the first and second control forces to the actuating piston 72 and the constant opposing biasing force of the return piston assembly 82 slidingly move the driven end 98 of the lever 96 within the actuator bore 66 thereby operatively moving the driving end 100 of the lever 96 to move the actuating disc 26 and the engagement mechanism 23 between the engaged and disengaged positions.

As shown in FIGS. 6, 7A, 7B, and 7C, one of the extending tabs of the actuating discs 26, indicated as 54A, is of a larger physical size than the others to accommodate the connection to the lever 96. Tab 54A includes a lever slot 102 that receives and retains the driving end 100 of the lever 96. Additionally, as shown in phantom in FIG. 8B, a lever slot 104 is open though the actuator bore 66 to the actuating disc 26, which allows the lever 96 to connect with the actuator disc 26 and move longitudinally in the actuator bore 66.

The actuating piston 72 also includes an indexing groove 106 formed in the outer surface of the actuating piston 72. The groove 106 is adapted to operatively interact with the pin 74 of the actuator bore 66 to provide repeated indexing movement of the actuating piston 72 thereby moving the engagement mechanism 23 between its engaged and disengaged positions. The indexing groove 106 includes an indexing portion 108 and a return portion 110 cooperatively connected to each other. The indexing portion 108 is formed circumferentially about the actuating piston 72 and the return portion 110 extends longitudinally from the indexing portion 108 toward the actuating head 76 of the actuating piston 72. The interaction of the indexing portion 108 with the pin 74 is adapted to cause a rotational movement of the actuating piston 72. The interaction of the return portion 110 with the pin 74 is adapted to cause a longitudinal movement of the actuating piston 72.

More specifically, the indexing portion 108 of the indexing groove 106 includes several surfaces that interact with the pin 74 in the actuator bore 66 to cause the actuator piston 72 to rotatably index and the return portion 110 of the indexing groove 106 allows the actuating piston 72 to move longitudinally back and forth within the bore 66. As best seen in FIG. 8B, the indexing portion 108 includes a retaining saddle 112 adapted to accept and retain the pin 74 as the actuating piston 72 is acted upon by the constant biasing force "B" in the absence of the momentary first or second control forces "C" such that the latching actuator 64 is retained in the latched position when the pin 74 is held in the retaining saddle 112. The indexing portion 108 further includes a first return cam surface 114 operatively connected to a return detent 116. The first return cam surface 114 is disposed within the indexing portion 108 opposite the retaining saddle 112 such that when the first control force operatively acts upon the actuating piston 72 the first return cam surface 114 contacts the pin 74 causing the actuating piston 72 to rotatably index along the first return cam surface 114 to the return detent 116. The return detent 116 operatively accepts and retains the pin 74 and prevents any further movement of the actuating piston 72 until the first control force is removed.

The indexing portion 108 further includes a second return cam surface 118 operatively connected to the return portion 110. The second return earn surface 118 is formed within the indexing portion 108 opposite the return detent 116. As the first control force is removed and the constant opposing biasing force operatively acts upon the actuating piston 72, the second return cam surface 118 contacts the pin 74 causing the actuating piston 72 to rotatably index along the second return cam surface 118 to the return portion 110 of the indexing groove 108. In turn, the return portion 110 operatively accepts the pin 74 and allows the biasing force to move the actuating piston 72 longitudinally to the return position. In this way, the engagement mechanism 23 is moved to the engaged position. The indexing portion 108 of the indexing groove 106 further includes a first latching cam surface 120 and a latching detent 122. The first latching cam surface 120 is formed within the indexing portion 108 opposite the return portion 110 such that as the second control force operatively acts upon the actuating piston 72, the return portion 110 travels longitudinally along the pin 74 until the first latching cam surface 120 contacts the 74 pin. In turn, the actuating piston 72 rotatably indexes to the latching detent 122. The latching detent 122 operatively accepts and retains the pin 74 and prevents any further movement of the actuating piston 72 until the second control force is removed.

The indexing portion 108 also includes a second latching cam surface 124 operatively connected to the retaining saddle 112. The second latching cam surface 124 is formed in the indexing portion 108 opposite the latching detent 112, such that as the second control force is removed and the constant opposing biasing force operatively acts upon the actuating piston 72, the second latching cam surface 124 contacts the pin 74 causing the actuating piston 72 to rotatably index to the retaining saddle 112. The retaining saddle 112 operatively accepts and retains the pin 72 thereby moving the actuating piston 72 to the latched position. In this way, the engagement mechanism 23 is moved to the disengaged position.

The bi-directional clutch 10 having a latching actuator 64 of the present invention overcomes the drawbacks of prior art clutches by being operable to selectively switch between the various modes of engagement by the momentary application of a control force. If one of the latching actuators 64 is in the latched position, a single momentary application of a control force, in conjunction with constant return biasing force of the actuator 64 will cause the actuator 64 to index to its return position and remain there. If one of the latching actuators 64 is in the return position, another single momentary application of the same control force, in conjunction with constant return biasing force of the actuator 64 will cause the actuator 64 to index to its latched position. This rapid and efficient change between the positions of the latching actuators 64 moves the engagement mechanism 23 of the clutch 10 between its engagement modes. Therefore, the bi-directional clutch 10 of the present invention moves between the modes of engagement efficiently and with great energy conservation. The latching feature of the actuators 64 of the present invention provide further energy conservation and increases in efficiency by eliminating the need for a constant application of control force which also prevents clutch failures by maintaining the selected position in the absence of a constantly supplied control force.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A bi-directional clutch assembly comprising:

an inner race, an outer race, and an engagement mechanism disposed between said inner race and said outer race, said engagement mechanism operable to move between a disengaged position wherein said inner and outer races may freely rotate relative to one another and an engaged position wherein said inner and outer races are locked so as to translate torque therebetween;

at least one actuator assembly operatively connected to said engagement mechanism and responsive to a first momentary control force to selectively move said engagement mechanism to said engaged position and to hold said engagement mechanism in said engaged position after said first control force has been terminated, said actuator further responsive to a sequentially applied second momentary control force to move said engagement mechanism to said disengaged position and to hold said engagement mechanism in said disengaged position after said second control force has been terminated and pending the selective application of a sequentially applied first control force;

said engagement mechanism further including at least one disc operatively connected to said actuator assembly, said actuator assembly further including a latching assembly operatively connected to said disc, said latching assembly including an actuating piston that is responsive to the application of said first and second control forces to move said actuating piston between latched and return positions, a return piston assembly that moves in response to movement of said actuating piston and generates a force acting in the direction opposite to the first and second control forces, and a lever disposed between and movable with said actuating piston and said return piston assembly, said lever operatively interconnected with said disc such that movement of said actuating piston and said return piston assembly moves said disc and said engagement mechanism between said disengaged and engaged positions.

2. A bi-directional clutch assembly as set forth in claim 1 wherein said latching assembly further includes an actuator bore having an adjacent end and a distal end, said actuating piston slidingly supported within said actuator bore proximate to said adjacent end, said return piston assembly slidingly supported within said actuator bore proximate to said distal end, and at least one pin fixedly mounted to and extending from the inner circumference of said actuator bore adapted to operatively interact with said actuating piston.

3. A bi-directional clutch assembly as set forth in claim 2 wherein said actuating piston further includes an actuating head adapted to operatively engage said lever and a plunger end distal from said actuating head, said plunger end of said actuating piston supported within said actuator bore proximate to said adjacent end of said actuator bore such that the first and the second control forces operatively act upon said plunger end to move said actuating piston within said actuator bore in operative contact with said lever, said actuating piston also including an indexing groove formed in the outer surface of said actuating piston and adapted to operatively interact with said pin of said actuator bore to provide repeated indexing movement of said actuating piston thereby moving said engagement mechanism between its engaged and disengaged positions.

4. A bi-directional clutch assembly as set forth in claim 3 wherein said return piston assembly further includes a return piston having a return head in operative contact with said lever opposite said actuating head of said actuating piston and a biased end distal from said return head with said biased end of said return piston proximate to said distal end of said actuator bore, a biasing member is operatively supported between said distal end of said actuator bore and said biased end of said return piston, said biasing member acting to provide a constant biasing force in opposition to the first and the second control forces as they are applied to said actuating piston.

5. A bi-directional clutch assembly as set forth in claim 4 wherein said lever further includes a driven end and a driving end, said driven end disposed within said actuator bore between and in operative communication with both said actuating head of said actuating piston and said return head of said return piston, said driving end operatively connected to said disc such that the application of the first and second control forces to said actuating piston and the constant opposing biasing force of said return piston slidingly move said driven end of said lever within said actuator bore thereby operatively moving said driving end of said lever to move said disc and said engagement mechanism between said engaged and disengaged positions.

6. A bi-directional clutch assembly as set forth in claim 5 wherein said indexing groove of said actuating piston further includes an indexing portion and a return portion cooperatively connected to each other, said indexing portion formed circumferentially about the actuating piston and said return portion extending longitudinally from said indexing portion toward said actuating head of said actuating piston, the interaction of said indexing portion with said at least one pin of said actuating bore adapted to cause rotational movement of said actuating piston, the interaction of said return portion with said pin adapted to cause longitudinal movement of said actuating piston.

7. A bi-directional clutch assembly as set forth in claim 6 wherein said indexing portion of said indexing groove further includes a retaining saddle adapted to accept and retain said pin as said actuating piston is acted upon by the constant biasing force in the absence of said first or said second control force such that said latching actuator is retained in said latched position when said pin is held in said retaining saddle.

8. A bi-directional clutch assembly as set forth in claim 7 wherein said indexing portion of said indexing groove further includes a first return cam surface operatively connected to a return detent, said first return cam surface disposed within said indexing portion opposite said retaining saddle such that when the first control force operatively acts upon said actuating piston said first return cam surface contacts said pin causing said actuating piston to rotatably index along said first return cam surface to said return detent, said return detent thereby operatively accepting and retaining said pin and preventing any further movement of said actuating piston until the first control force is removed.

9. A bi-directional clutch assembly as set forth in claim 8 wherein said indexing portion of said indexing groove further includes a second return cam surface operatively connected to said return portion, said second return cam surface operatively disposed within said indexing portion opposite said return detent such that as the first control force is removed and the constant opposing biasing force operatively acts upon said actuating piston, said second return cam surface contacts said pin causing said actuating piston to rotatably index along said second return cam surface to said return portion of said indexing groove, said return portion operatively accepting said pin and allowing the biasing force to move said actuating piston longitudinally to said return position thereby causing said engagement mechanism to move to said engaged position.

10. A bi-directional clutch assembly as set forth in claim 9 wherein said indexing portion of said indexing groove further includes a first latching cam surface and an latching detent, said first latching cam surface operatively disposed within said indexing portion opposite said return portion such that as the second control force operatively acts upon said actuating piston said return portion travels longitudinally along said pin until said first latching cain surface contacts said pin causing said actuating piston to rotatably index to said latching detent, said latching detent operatively accepting and retaining said pin and preventing any further movement of said actuating piston until the second control force is removed.

11. A bi-directional clutch assembly as set forth in claim 10 wherein said indexing portion of said indexing groove further includes a second latching cam surface operatively connected to said retaining saddle, said second latching cam surface operatively positioned in said indexing portion opposite said latching detent such that as the second control force is removed and the constant opposing biasing force operatively acts upon said actuating piston, said second latching cam surface contacts said pin causing said actuating piston to rotatably index to said retaining saddle, said retaining saddle operatively accepting and retaining said pin thereby moving said actuating piston to said latched position and causing said engagement mechanism to move to said disengaged position.

12. A bi-directional clutch assembly as set forth in claim 11 wherein said actuator includes two discs each operatively connected to separate engagement mechanisms with two separate latching mechanisms operatively and separately connected to said discs, said engagement mechanisms individually responsive to the first and second control forces to move said discs such that said engagement mechanisms are moved between said engaged and disengaged positions and said bi-directional clutch is operatively controllable in both rotational directions separately.

13. A bi-directional clutch assembly comprising:
an inner race, an outer race, and an engagement mechanism disposed between said inner race and said outer race, said engagement mechanism including at least one actuator disc operable to move said engagement mechanism between a disengaged position wherein said inner and outer races may freely rotate relative to one another and an engaged position wherein said inner and outer races are locked so as to translate torque therebetween; and at least one actuator assembly operatively connected to said actuator disc, said actuator assembly includes a latching assembly operatively connected to said engagement mechanism and responsive to a first momentary control force to selectively move said actuator disc to said engaged position and to hold said actuator disc in said engaged position after said first control force has been terminated, said latching assembly further responsive to a sequentially applied second momentary control force to move said actuator disc to said disengaged position and to hold said engagement mechanism in said disengaged position after said second control force has been terminated and pending the selective application of a sequentially applied first control force, said latching assembly includes an actuating piston that is responsive to the application of said first and second control forces to move said actuating piston between latched and return positions, a return piston assembly that moves in response to movement of said actuating piston and generates a force acting in the direction opposite to the first and second control forces, and a lever disposed between and movable with said actuating piston and said return piston assembly, said lever operatively interconnected with said disc such that movement of said actuating piston and said return piston assembly moves said disc and said engagement mechanism between said disengaged and engaged positions.

14. A bi-directional clutch assembly as set forth in claim 13 wherein said actuator includes two discs each operatively connected to separate engagement mechanisms with two separate latching mechanisms operatively and separately connected to said discs, said engagement mechanisms individually responsive to the first and second control forces to move said discs such that said engagement mechanisms are moved between said engaged and disengaged positions and said bi-directional clutch is operatively controllable in both rotational directions separately.

15. A bi-directional clutch assembly as set forth in claim 14 wherein said first and said second actuator discs are nested on one side of said clutch assembly.

16. A bi-directional clutch assembly comprising:

an inner race, an outer race, a first engagement mechanism, and a second engagement mechanism, said engagement mechanisms disposed between said inner race and said outer race, said first engagement mechanism including a first actuator disc and said second engagement mechanisms including a second actuator disc, said first and said second actuator discs operable to move said first and said second engagement mechanisms between a disengaged position wherein said inner and outer races may freely rotate relative to one another and an engaged position wherein said inner and outer races are locked so as to translate torque therebetween; and a first actuator assembly including a first latching assembly operatively connected to said first actuator disc and a second actuator assembly including a second latching assembly operatively connected to said second actuator disc that are said first latching assembly operatively connected to said first engagement mechanism and said second latching assembly operatively connected to said second engagement mechanism;

each of said first and said second engagement mechanisms responsive to a first momentary control force to selectively move said respective actuator disc to said engaged position and to hold said actuator disc in said engaged position after said first control force has been terminated, said first and said second latching assembly further responsive to a sequentially applied second momentary control force to move said respective actuator disc to said disengaged position and to hold said actuator disc in said disengaged position after said second control force has been terminated and pending the selective application of a sequentially applied first control force.

17. A bi-directional clutch assembly as set forth in claim 16 wherein each said latching assembly includes an actuating piston that is responsive to the application of said first and second control forces to move said actuating piston between latched and return positions, a return piston assembly that moves in response to movement of said actuating piston and generates a force acting in the direction opposite to the first and second control forces, and a lever disposed between and movable with said actuating piston and said return piston assembly, said levers operatively interconnected with each of said respective actuating discs such that movement of said actuating piston and said return piston assembly moves said respective actuating disc and said respective engagement mechanism between said disengaged and engaged positions.

* * * * *